United States Patent
Kamio

(10) Patent No.: US 11,192,529 B2
(45) Date of Patent: *Dec. 7, 2021

(54) VEHICLE CONTROL DEVICE

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 168 days.

This patent is subject to a terminal disclaimer.

(21) Appl. No.: 16/556,402

(22) Filed: Aug. 30, 2019

(65) Prior Publication Data

US 2019/0381976 A1 Dec. 19, 2019

Related U.S. Application Data

(63) Continuation of application No. PCT/JP2018/010130, filed on Mar. 15, 2018.

(30) Foreign Application Priority Data

Mar. 29, 2017 (JP) .............................. JP2017-065386

(51) Int. Cl.
*B60T 7/04* (2006.01)
*B60T 1/06* (2006.01)
(Continued)

(52) U.S. Cl.
CPC .............. *B60T 7/045* (2013.01); *B60T 1/062* (2013.01); *B60T 7/12* (2013.01); *B60W 10/182* (2013.01);
(Continued)

(58) Field of Classification Search
CPC ............ B60T 1/062; B60T 7/045; B60T 7/12; B60W 10/182; B60W 30/18118; B60W 2710/186; B60W 2710/188
(Continued)

(56) References Cited

U.S. PATENT DOCUMENTS 6,905,181 B2 * 6/2005 Iwagawa ................. B60T 7/107
188/162
7,908,071 B2 * 3/2011 Nakayama .............. B60T 7/122
701/70

(Continued)

FOREIGN PATENT DOCUMENTS

JP 5-124493 5/1993
JP 2006-224739 8/2006
(Continued)

*Primary Examiner* — Krishnan Ramesh
(74) *Attorney, Agent, or Firm* — Nixon & Vanderhye P.C.

(57) ABSTRACT

A parking brake control device is a control device for a vehicle used in a vehicle on which a shift by wire system and an electric parking brake system are mounted. A function of automatically operating an electric parking brake without an operation of the driver of the vehicle is referred to as an EPB automatic operation function, and a request by the driver for disabling the EPB automatic operation function is referred to as a disabling request. The parking brake control device includes a disabling determination part configured to determine a presence or absence of the disabling request, a vehicle stop determination part configured to determine whether the vehicle is stopped, a slope determination part configured to determine whether the vehicle is located on a slope, and an EPB automatic operation part. The EPB automatic operation part operates the electric parking brake when the vehicle is stopped on the slope even if the disabling request is made.

7 Claims, 4 Drawing Sheets

(51) Int. Cl.
  *B60T 7/12* (2006.01)
  *B60W 10/18* (2012.01)
  *B60W 30/18* (2012.01)
(52) U.S. Cl.
  CPC . *B60W 30/18118* (2013.01); *B60W 2710/186* (2013.01); *B60W 2710/188* (2013.01)
(58) Field of Classification Search
  USPC .......................................................... 701/70
  See application file for complete search history.

(56) References Cited

U.S. PATENT DOCUMENTS

| | | | | |
|---|---|---|---|---|
| 2002/0023818 | A1* | 2/2002 | Yanaka | B60T 13/662 192/219.4 |
| 2004/0016612 | A1* | 1/2004 | Iwagawa | B60T 7/107 188/265 |
| 2004/0122580 | A1* | 6/2004 | Sorrells | G07C 5/008 701/80 |
| 2010/0004095 | A1* | 1/2010 | Sokoll | B60T 7/122 477/198 |
| 2013/0252785 | A1* | 9/2013 | Kinoshita | B60W 30/18018 477/97 |
| 2015/0353142 | A1* | 12/2015 | Iriguchi | B60N 3/102 180/90 |
| 2016/0082969 | A1* | 3/2016 | Jang | B60T 7/122 477/7 |

FOREIGN PATENT DOCUMENTS

| | | |
|---|---|---|
| JP | 2011-11579 | 1/2011 |
| JP | 5375775 | 12/2013 |
| WO | 2018/155332 | 8/2018 |

* cited by examiner

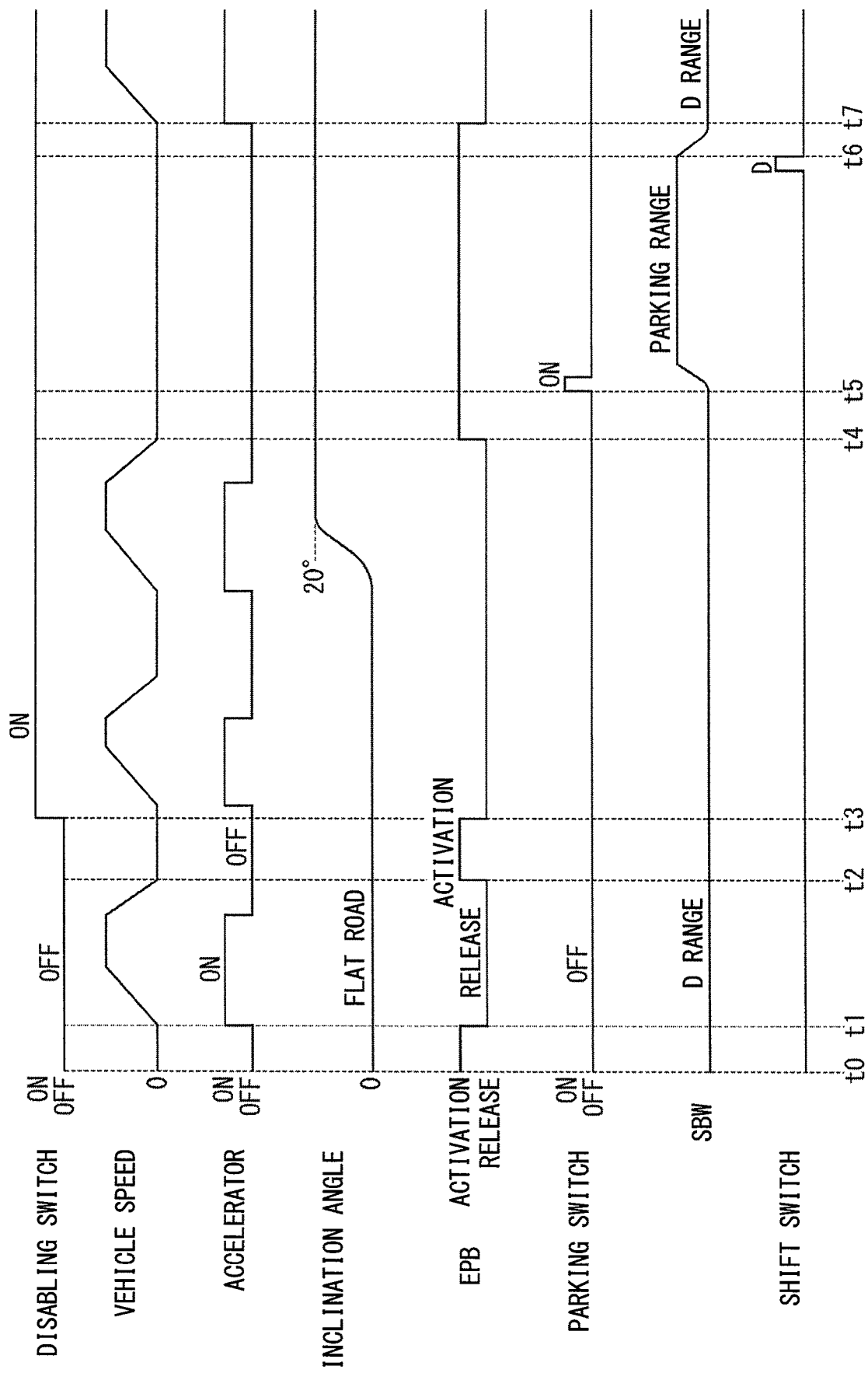

VEHICLE CONTROL DEVICE

CROSS REFERENCE TO RELATED APPLICATIONS

This application is a continuation application of International Patent Application No. PCT/JP2018/010130 filed on Mar. 15, 2018, which designated the U.S. and based on and claims the benefits of priority of Japanese Patent Application No. 2017-65386 filed on Mar. 29, 2017. The entire disclosure of all of the above applications is incorporated herein by reference.

TECHNICAL FIELD

The present disclosure relates to a vehicle control device.

BACKGROUND

A shift-by-wire system operates a shift range switching mechanism of a vehicle by a shift actuator using a motor or the like as a drive source.

SUMMARY

The vehicle control device includes a disabling determination part, a vehicle stop determination part, a slope determination part, and an EPB automatic operation part. The disabling determination part determines whether there is a disabling request. The vehicle stop determination part determines whether the vehicle is stopped. The slope determination part determines whether the vehicle is located on a slope. The EPB automatic operation part operates the electric parking brake by the EPB automatic operation function when the vehicle is located on the slope and the vehicle is stopped even when the disabling request is made.

BRIEF DESCRIPTION OF DRAWINGS

The above and other objects, features and advantages of the present disclosure will become more apparent from the following detailed description made with reference to the accompanying drawings. In the drawings:

FIG. 4 is a time chart showing an example of an operation according to the process in FIG. 3.

DETAILED DESCRIPTION

Hereinafter, one embodiment will be described based on the drawings.

One Embodiment

Figure 1:
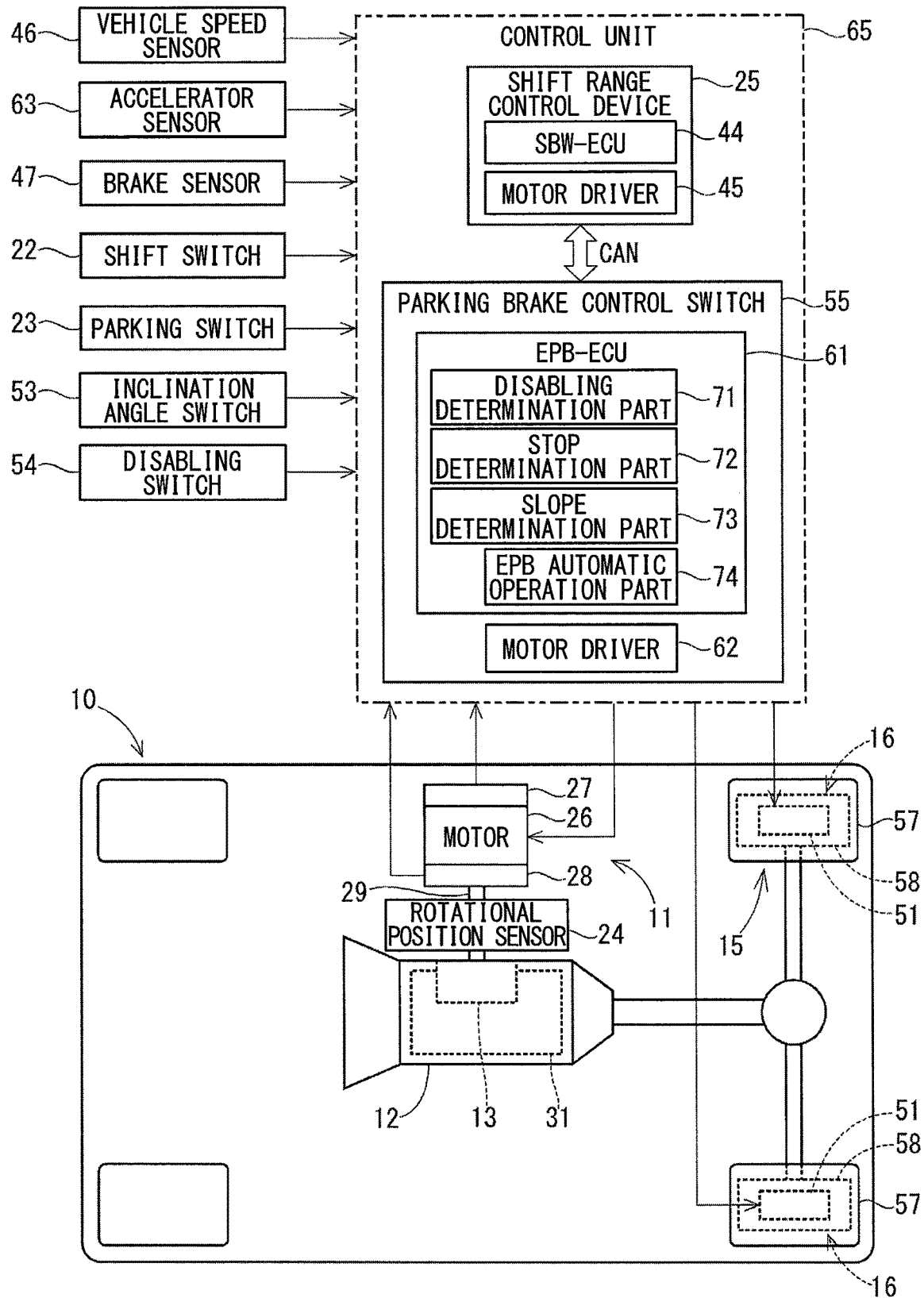
FIG. 1 is a conceptual diagram illustrating a vehicle to which a parking brake control device in an embodiment is applied.

A parking brake control device, which is a control device for a vehicle according to one embodiment, is used in a vehicle equipped with a shift-by-wire system (hereinafter, referred to as SBW system) and an electric parking brake system (hereinafter, referred to as EPB system). As shown in FIG. 1, a SBW system 11 in a vehicle 10 is a system that electrically controls a shift range switching mechanism 13 of an automatic transmission 12. An EPB system 15 is a system that electrically controls a parking brake mechanism 16.

<SBW System>

First, the configuration of the SBW system 11 will be described with reference to FIGS. 1 and 2.

As shown in FIG. 1, the SBW system 11 includes a shift actuator 21, a shift switch 22, a parking switch 23, a rotational position sensor 24, and a shift range control device 25.

The shift actuator 21 is an electric actuator that outputs rotational power, and includes a motor 26, an encoder 27, a reduction unit 28, and an output shaft 29. The encoder 27 detects a rotational position of the motor 26. The reduction unit 28 reduces the rotation of the motor 26. The output shaft 29 is connected to the shift range switching mechanism 13. When the output shaft 29 rotates, the shift range switching mechanism 13 operates, and a valve position of a range switching valve 32 provided in a hydraulic circuit 31 of the automatic transmission 12 changes. A shift range of the automatic transmission 12 is switched in accordance with the valve position of the range switching valve 32.

Figure 2:
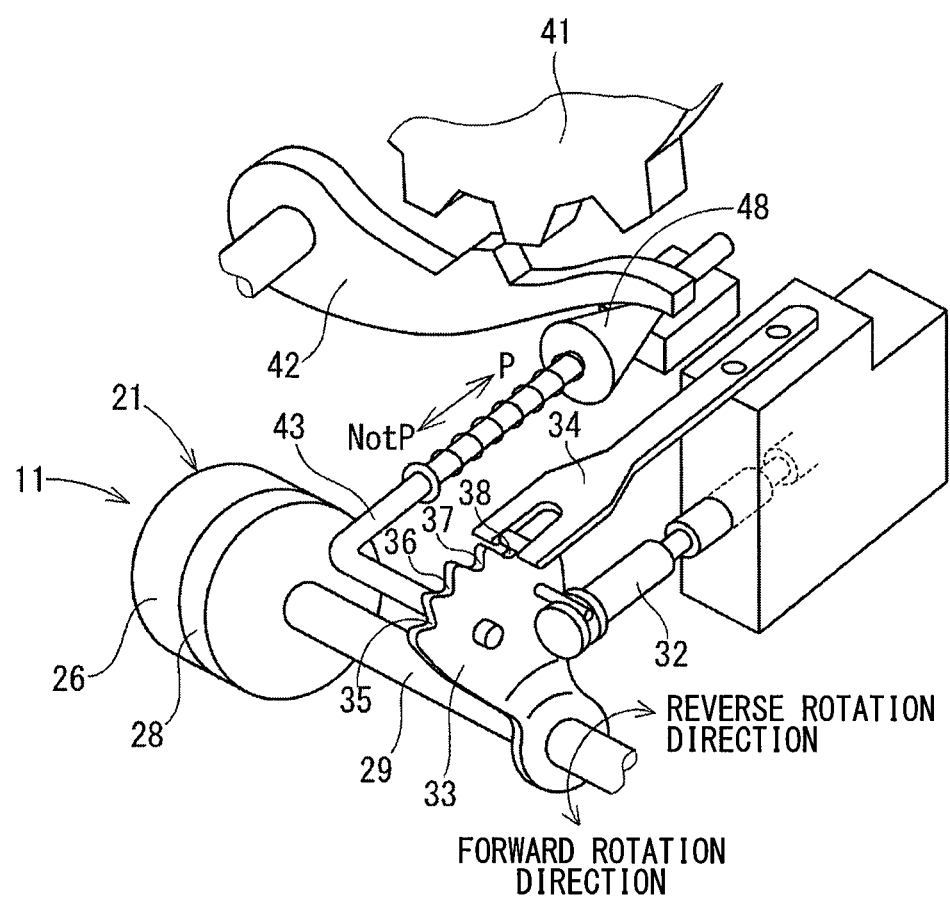
FIG. 2 is a perspective view of the shift range switching mechanism in FIG. 1.

As shown in FIG. 2, the shift range switching mechanism 13 (see, FIG. 1) has a detent plate 33 and a detent spring 34. The detent plate 33 rotates integrally with the output shaft 29 of the shift actuator 21. The valve position of the range switching valve 32 is changed as the detent plate 33 rotates. The detent spring 34 holds the rotational position of the detent plate 33 by being fitted into any one of the plurality of recesses 35 to 38 formed in the outer edge of the detent plate 33.

Further, the shift range switching mechanism 13 has a parking gear 41, a parking pole 42, and a parking rod 43 as components constituting a parking lock mechanism. The parking gear 41 rotates integrally with the output shaft of the automatic transmission 12. The parking pole 42 can move toward the parking gear 41 and move away from the parking gear 41, and engages with the parking gear 41 so as to lock the rotation of the output shaft of the automatic transmission 12. The parking rod 43 is connected to the detent plate 33. When the rotational position of the detent plate 33 is in a position corresponding to the parking range, the conical body 48 provided at a tip of the parking rod 43 is pushed to a lower side of the parking pole 42, whereby the parking pole 42 is pushed up. As a result, the parking pole 42 and the parking gear 41 are engaged with each other.

Returning to FIG. 1, the shift switch 22 is operated by the driver of the vehicle 10, and outputs a signal according to the shift range requested by the driver (hereinafter, referred to as requested shift range). The required shift range by the shift switch 22 includes, for example, a neutral range, a reverse range, and a drive range. The parking switch 23 is operated by the driver of the vehicle 10, and outputs a signal corresponding to a request for switching to the parking range by the driver. The rotational position sensor 24 detects the rotational position of the output shaft 29, and outputs a signal corresponding to the rotational position.

The shift range control device 25 includes an electronic control unit 44 (hereinafter, referred to as SBW-ECU) mainly composed of a microcomputer, and a motor driver 45 including an inverter for controlling energization of a winding of the motor 26. A SBW-ECU 44 outputs a command signal for driving the shift actuator 21 in accordance with the output signals of a vehicle speed sensor 46, a brake sensor 47, the shift switch 22, and the parking switch 23. The motor driver 45 drives the shift actuator 21 in accordance with the command signal from the SBW-ECU 44. The shift range control device 25 drives the shift actuator 21 so as to control the shift range.

<EPB System>

Next, the configuration of the EPB system 15 will be described with reference to FIG. 1.

The EPB system 15 includes a parking actuator 51, the parking switch 23, an inclination angle sensor 53, a disabling switch 54, and a parking brake control device 55.

The parking actuator 51 is an electric actuator, and constitutes an electric parking brake 56 together with the parking brake mechanism 16. In the present embodiment, the parking brake mechanism 16 is a drum type brake and operates separately from the hydraulically actuated foot brake. The parking actuator 51 is built in a brake drum 58 that rotates together with a rear wheel 57, and operates to press a brake shoe (not shown) against the brake drum 58 when the parking brake is applied. On the other hand, the parking actuator 51 operates to release the brake shoe from the brake drum 58 when releasing the parking brake. Hereinafter, the electric parking brake 56 is described as the EPB 56.

The inclination angle sensor 53 detects an inclination angle of the vehicle 10 and outputs a signal corresponding to the inclination angle. The inclination angle of the vehicle 10 corresponds to the gradient of the road surface on which the vehicle 10 is located, and can be used to determine whether the vehicle 10 is located on a slope. The disabling switch 54 is operated by the driver of the vehicle 10 and outputs a signal corresponding to the presence or absence of the disabling request of the EPB automatic operation function by the driver.

Here, the "EPB automatic operation function" is a function that applies the parking brake by automatically operating the electric parking brake 56 to apply a parking brake when predetermined conditions such as stopping the vehicle are met. The EPB automatic operating function is used for releasing the driver from the foot brake operation at the time of stopping in a flat road, and is used for preventing the vehicle from falling down at the time of starting the vehicle on a slope. The EPB automatic operating function can be selectively disabled for the driver to avoid acceleration delays at the time of starting the vehicle. The request for the disablement is the above-mentioned "disabling request of the EPB automatic operation function".

The parking brake control device 55 includes an electronic controller 61 (hereinafter, referred to as EPB-ECU) mainly composed of a microcomputer, and a motor driver 62 including an inverter for controlling energization of a motor of the parking actuator 51. The EPB-ECU 61 outputs a command signal for driving the parking actuator 51 according to the output signals of the vehicle speed sensor 46, the accelerator sensor 63, the parking switch 23, the inclination angle sensor 53, and the disabling switch 54. The motor driver 62 drives the parking actuator 51 in response to the command signal from the EPB-ECU 61. The parking brake control device 55 drives the parking actuator 51 to control the operation of the electric parking brake 56.

The parking brake control device 55 constitutes a controller 65 of the vehicle 10 together with the shift range control device 25. The controller 65 further includes an engine control device (not shown). The output signals of the various sensors acquired by the controller 65 are shared among the control devices through a communication path such as CAN, for example.

<EPB-ECU>

Next, the detailed configuration of the EPB-ECU 61 will be described with reference to FIG. 1.

When the vehicle is stopped on the slope, the electric parking brake 56 is automatically operated by the EPB automatic operation function, whereby the movement of the vehicle 10 due to gravity is suppressed by the electric parking brake 56. Therefore, it has been considered that the required torque of the shift actuator 21 for parking release can be reduced. The automatic actuation of the electric parking brake 56 for this purpose is a completely new idea that has never been done before.

However, when the EPB automatic operation function is disabled by the disabling switch 54, and when the electric parking brake 56 is configured not to be activated when the vehicle is stopped on the slope, a new problem arises that the required torque of the shift actuator 21 for releasing the parking can not be reduced.

As a configuration for solving such a problem, as shown in FIG. 1, the EPB-ECU 61 includes a disabling determination part 71 which is a functional part related to control for automatically operating the electric parking brake 56 (hereinafter, related to as EPB automatic operation control), a stop determination part 72, a slope determination part 73, and an EPB automatic operation part 74.

The disabling determination part 71 determines the presence or absence of a disabling request for the EPB automatic operation function based on the output signal of the disabling switch 54. The stop determination part 72 10 determines whether the vehicle 10 is stopped based on the output signal of the vehicle speed sensor 46. For example, when the vehicle speed is 0, it is determined that the vehicle 10 is stopped.

The slope determination part 73 determines whether the vehicle 10 is positioned on the slope based on the output signal of the inclination angle sensor 53. When the inclination angle of the vehicle 10 is equal to or more than a predetermined value, it is determined that the vehicle 10 is located on a slope. When the inclination angle of the vehicle 10 is smaller than the predetermined value, it is determined that the vehicle 10 is not on the slope (the vehicle is located on the flat road).

The EPB automatic operation part 74 exerts an EPB automatic operation function when there is no disabling request. In the present embodiment, "to exert the EPB automatic operation function" means to operate the electric parking brake 56 so as to apply the parking brake when the vehicle is stopped.

In addition, even when there is the disabling request, the EPB automatic operation part 74 exerts the EPB automatic operation function when the vehicle 10 is positioned on the slope. When the shift range is the travel range (i.e., the drive range or reverse range) and the accelerator is turned on in the operating state of the electric parking brake 56, the EPB automatic operation part 74 releases the electric parking brake 56 so as to release the parking brake.

Each of functional parts 71 to 74 possessed by the EPB-ECU 61 may be realized by hardware processing with a dedicated logic circuit, or by software processing by executing on a CPU a program stored in advance in a memory such as a computer readable non-transitory tangible recording medium, or by a combination of the hardware processing and the software processing. Which part of the functional parts 71 to 74 is realized by the hardware processing and which part is realized by the software processing can be appropriately selected.

<Process Executed by EPB-ECU>

Figure 3:
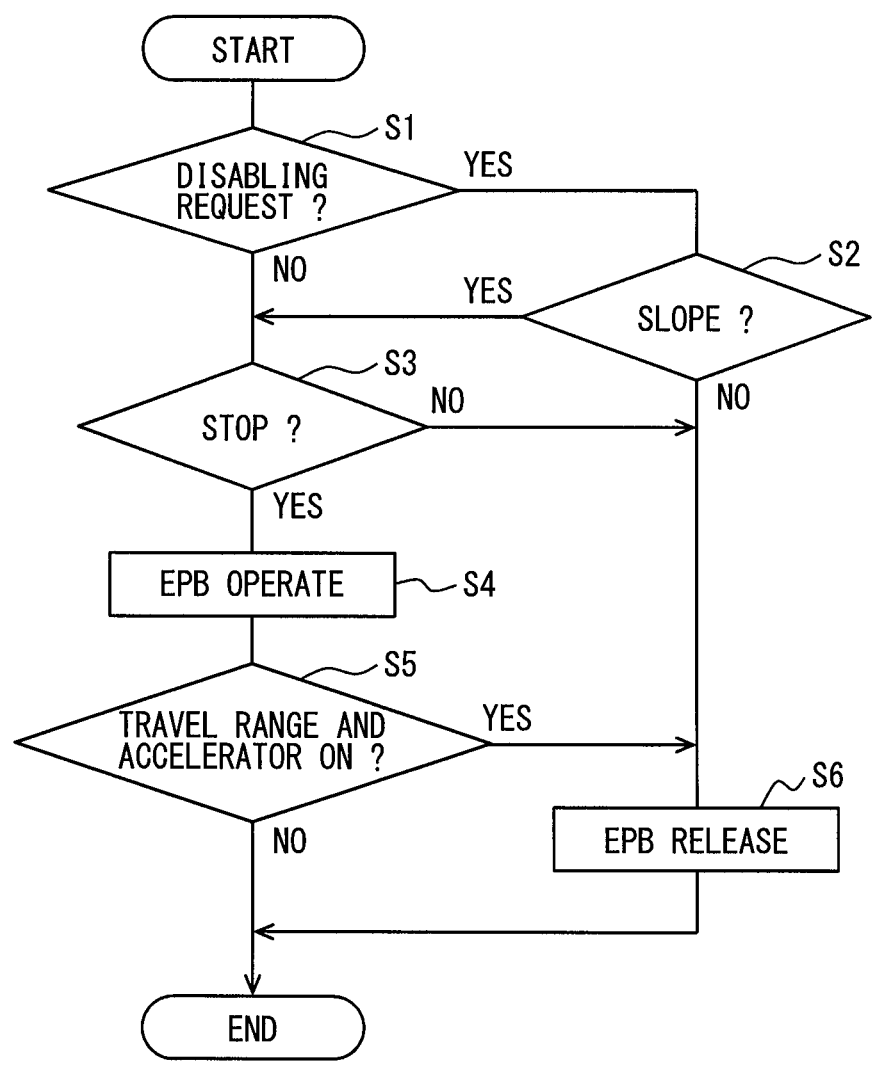
FIG. 3 is a flow chart for explaining processing executed by an electronic control unit of the parking brake control device in FIG. 1.

Next, a series of processes performed by the EPB-ECU 61 for EPB automatic operation control will be described with reference to FIGS. 1 and 3. A routine shown in FIG. 3 is repeatedly executed after activation of the EPB-ECU 61. Hereinafter, "S" means step.

In S1 of FIG. 3, the disabling determination part 71 determines whether or not there is the disabling request of the EPB automatic operation function, based on the output signal of the disabling switch 54.

If there is the disabling request of the EPB automatic operation function (S1: YES), the process proceeds to S2.

If there is no disabling request of the EPB automatic operation function (S1: NO), the process proceeds to S3.

In S2, the slope determination part 73 determines whether the vehicle 10 is positioned on the slope based on the output signal of the inclination angle sensor 53.

If the vehicle 10 is located on the slope (S2: YES), the process proceeds to S3.

If the vehicle 10 is not located on the slope (S2: NO), the process proceeds to S6.

In S3, the stop determination part 72 determines whether the vehicle 10 is stopped based on the output signal of the vehicle speed sensor 46.

When the vehicle 10 is stopped (S3: YES), the process proceeds to S4.

If the vehicle 10 is not stopped (S3: NO), the process proceeds to S6.

In S4, the EPB automatic operation part 74 operates the electric parking brake 56 to apply the parking brake. After S4, the processing proceeds to S5.

In S5, the EPB automatic operation part 74 determines whether the shift range is the travel range and the accelerator is turned on.

If the shift range is the travel range and the accelerator is turned on (S5: YES), the process proceeds to S6.

When the shift range is not the travel range or when the accelerator is off (S5: NO), the process exits the routine of FIG. 3.

In S6, the EPB automatic operation part 74 releases the parking brake so as to release the electric parking brake 56. After S6, the process exits the routine of FIG. 3.

Specific Operation Example

Next, an example of the operation by the EPB-ECU 61 will be described with reference to FIG. 4.

At time t0 in FIG. 4, since the disabling switch 54 is off (i.e., there is no disabling request) and the vehicle speed is 0 (i.e., the vehicle is stopped), the EPB 56 is activated by the EPB automatic operation function.

At time t1 in FIG. 4, when the disabling switch 54 is off and the vehicle speed is 0, the shift range is the drive range and the accelerator is turned on, so the EPB 56 is in the released state. At this time t1, the determination of S5 of FIG. 3 is affirmed, and the process of S6 is performed.

At time t2 in FIG. 4, the vehicle speed becomes 0 when the disabling switch 54 is off, so the EPB 56 is activated. At this time point t2, the process of S4 of FIG. 3 is executed.

At time t3 in FIG. 4, since the disabling switch 54 is turned on (that is, there is the disabling request), and the inclination angle is 0 (that is, the vehicle 10 is not located on the slope), the EPB 56 is in the released state. At this time t3, the determination of S1 of FIG. 3 is affirmed and the determination of S2 is denied, and the process of S6 is executed.

At time t4 in FIG. 4, when the disabling switch 54 is ON and the inclination angle is not 0 (that is, the vehicle 10 is located on the slope), the vehicle speed becomes 0, so the EPB 56 is activated. At this time t4, the determination of S1 in FIG. 3 is affirmed, the determination of S2 is affirmed, and the determination of S3 is affirmed, and the process of S4 is executed.

Since the parking switch 23 is turned on at time t5 in FIG. 4, the shift range control device 25 drives the shift actuator 21 so as to switch the shift range from the drive range to the parking range. While the shift range is switched from the drive range to the parking range, the EPB 56 is in operation state and the movement of the vehicle due to gravity is suppressed.

At time t6 in FIG. 4, since the instruction of the drive range instruction by the shift switch 22 is determined, the shift range control device 25 drives the shift actuator 21 to switch the shift range from the parking range to the drive range. During the time t4 to t6, the movement of the vehicle due to gravity is suppressed by the EPB 56. As a result, the force for moving the vehicle due to gravity is less likely to be applied to the engaging portion between the parking gear 41 and the parking pole 42. Therefore, the shift actuator 21 can easily remove the parking pole 42 from the parking gear 41 at time t6. That is, an increase in motor torque necessary for releasing the engagement is suppressed.

Since the shift range is the drive range and the accelerator is turned on at time t7 in FIG. 4, the EPB 56 is in the released state. At this time t7, the determination of S5 of FIG. 3 is affirmed, and the process of S6 is performed.

<Advantages>

As described above, in the present embodiment, the parking brake control device 55 includes the disabling determination part 71, the vehicle stop determination part 72, the slope determination part 73, and the EPB automatic operation part 74.

The disabling determination part 71 determines the presence or absence of the disabling request.

The vehicle stop determination part 72 determines whether the vehicle 10 is stopped.

The slope determination part 73 determines whether the vehicle 10 is located on the slope.

The EPB automatic operation part 74 operates the electric parking brake 56 by the EPB automatic operation function when the vehicle 10 is located on the slope and the vehicle 10 is stopped even when the disabling request is made.

As described above, when the vehicle 10 is stopped on the slope, the movement of the vehicle due to gravity is suppressed by the electric parking brake 56 by automatically operating the electric parking brake 56 regardless of the disabling request. Therefore, the force applied to the engaging portion between the parking gear 41 and the parking pole 42 of the shift range switching mechanism 13 decreases when the vehicle parks on the slope. Therefore, since the torque of the shift actuator 21 required at the time of parking release is reduced, the size of the shift actuator 21 can be reduced.

Further, in the present embodiment, when the electric parking brake 56 is in the operating state by the EPB automatic operation function at the time of parking on the slope, and when the shift range is the traveling range and the accelerator is turned on, EPB automatic operation part 74 releases the EPB 56.

Therefore, at the time of parking on the slope, the electric parking brake 56 is not released in response to the accelerator on or the like, even though the parking is not released. For example, the electric parking brake 56 will not be released even if the accelerator is turned on between time t5 and time t6 in FIG. 4. Therefore, the parking release is performed in a state in which the movement of the vehicle 10 due to gravity is reliably suppressed by the electric parking brake 56.

Other Embodiments

In other embodiment, the conditions for activating the electric parking brake by the EPB automatic operation function may include conditions other than that the vehicle is stopped.

In other embodiment, the parking actuator is not limited to directly operate a locking member such as a shoe or a pad of the parking brake mechanism, but may operate a control member such as a brake wire or the like.

In other embodiment, the parking brake mechanism is not limited to the drum type, and may be another type such as a disc type or the like.

In other embodiment, the electric parking brake may be provided not only on the rear wheels but also on the front wheels or on a drive shaft other than the wheels.

The present disclosure has been described based on the embodiments. However, the present disclosure is not limited to the embodiments and structures. This disclosure also encompasses various modifications and variations within the scope of equivalents. Furthermore, various combination and formation, and other combination and formation including one, more than one or less than one element may be made in the present disclosure.

In an assumable example, a shift-by-wire system operates a shift range switching mechanism of a vehicle by a shift actuator using a motor or the like as a drive source. In this system, it is not necessary to mechanically connect the shift range switching mechanism and an operation unit thereof. Therefore, the installation place of the operation unit and the degree of freedom in design are increased.

By the way, when the vehicle is parked on a slope, a force that the vehicle tends to move by gravity is applied to an engaging portion between a parking gear and a parking pole of the shift range switching mechanism via an axle or the like. Therefore, the torque of the shift actuator required for releasing an engagement between the parking gear and the parking pole (hereinafter referred to as parking release) and switching the shift range is larger on a slope than on a flat surface.

On the other hand, the control device of the shift-by-wire system once rotates the motor in the direction opposite to the range switching direction and then rotates it in the range switching direction, so that kinetic energy in the range switching direction is increased. Thus, the parking release on the slope is carried out by using a relatively small motor.

However, even when the motor is operated, parking may not be released when the vehicle is parked on a slope having a relatively large inclination. Therefore, the torque required for the motor of the shift actuator motor cannot be sufficiently reduced at the time of parking release, and there is a limit to miniaturizing the shift actuator. It is an object of the present disclosure to provide a vehicle control device that can miniaturize the shift actuator of the shift-by-wire system.

In the vehicle equipped with an electric parking brake system, there is a function (hereinafter referred to as an EPB automatic operation function) for automatically operating the electric parking brake when a predetermined condition, such as stopping, is met. The operating state of the parking brake by the EPB automatic operation function is released, for example, by an accelerator on. The EPB automatic operation function is used for releasing the driver from the foot brake operation at the time of stopping in a flat road, and is used for preventing the vehicle from falling down at the time of starting the vehicle on a slope.

When the vehicle is stopped on the slope, the electric parking brake is automatically operated, whereby the movement of the vehicle due to gravity is suppressed by the electric parking brake. Therefore, the present disclosure person has considered that the required torque of the shift actuator for parking release can be reduced. The automatic actuation of the electric parking brake for this purpose is a completely new idea that has never been done before.

However, in the current electric parking brake system, the EPB automatic operation function can be selectively disabled for the driver to avoid an acceleration delay at the timing of starting. As described above, when the EPB automatic operation function is disabled, the electric parking brake is not operated when the vehicle stops on the slope. So, a new problem arises that the torque required by the shift actuator for releasing the parking cannot be reduced. The present disclosure person completed the present disclosure based on this finding.

The present disclosure is a vehicle control device that is used in a vehicle equipped with a shift-by-wire system and an electric parking brake system. Here, the function of automatically operating the electric parking brake without an operation of the driver of the vehicle is referred to as an EPB automatic operation function, and the request by the driver for disabling the EPB automatic operation function is referred to as a disabling request.

The vehicle control device includes a disabling determination part, a vehicle stop determination part, a slope determination part, and an EPB automatic operation part. The disabling determination part determines whether there is a disabling request. The vehicle stop determination part determines whether the vehicle is stopped. The slope determination part determines whether the vehicle is located on a slope. The EPB automatic operation part operates the electric parking brake by the EPB automatic operation function when the vehicle is located on the slope and the vehicle is stopped even when the disabling request is made.

As described above, when the vehicle stops on the slope, the movement of the vehicle due to gravity is suppressed by the electric parking brake by automatically operating the electric parking brake regardless of the disabling request. Therefore, the force applied to the engaging portion between the parking gear and the parking pole of the shift range switching mechanism decreases when the vehicle parks on the slope. Therefore, since the torque of the shift actuator required at the time of parking release is reduced, the size of the shift actuator can be reduced.

The vehicle control device that is used in a vehicle equipped with a shift-by-wire system and an electric parking brake system includes a processor configured to determine a presence or absence of the disabling request, determine whether the vehicle is stopped or not, determine whether the vehicle is located on a slope, and operate the electric parking brake by the EPB automatic operation function when the vehicle is stopped on the slope while the disabling request is made.

In the above description, when the function of automatically operating the electric parking brake without an operation of the driver of the vehicle is referred to as an EPB automatic operation function, and a request by the driver for disabling the EPB automatic operation function is referred to a disabling 15 request.

The invention claimed is:

1. A vehicle control device that is used in a vehicle equipped with a shift-by-wire system and an electric parking brake (EPB) system, comprising:

when a function of automatically operating an electric parking brake without an operation of a driver of the vehicle is referred to as an EPB automatic operation function, and a request by the driver for disabling the EPB automatic operation function is referred to as a disabling request, logic circuitry and/or a processor executing instructions stored in memory, the logic circuitry and/or the processor being configured to implement at least:

a disabling determination part configured to determine a presence or absence of the disabling request;

a stop determination part configured to determine whether the vehicle is stopped or not;

a slope determination part configured to determine whether the vehicle is located on a slope; and an EPB automatic operation part configured to operate the electric parking brake by the EPB automatic operation function, such that the parking brake is operated, when the vehicle is stopped on the slope while the disabling request is made, and continue operation of the parking brake while the vehicle remains stopped on the slope after the disabling request has been made.

2. The vehicle control device according to claim 1, wherein the EPB automatic operation part continues an operating state of the parking brake that was activated when the vehicle is stopped on the slope during the disabling request, while a shift range control device drives a shift actuator to switch the shift range from a drive range to a parking range.

3. The vehicle control device according to claim 2, wherein the EPB automatic operating part releases an operating state of the parking brake that was activated when the vehicle is stopped on the slope during the disabling request, when the shift range is a travel range and an accelerator is turned on.

4. The vehicle control device according to claim 1, wherein the EPB automatic operating part releases an operating state of the parking brake that was activated when the vehicle is stopped on the slope during the disabling request, when the shift range is a travel range and an accelerator is turned on.

5. A vehicle control device that is used in a vehicle equipped with a shift-by-wire system and an electric parking brake (EPB) system, comprising:

when a function of automatically operating an electric parking brake without an operation of a driver of the vehicle is referred to as an EPB automatic operation function, and a request by the driver for disabling the EPB automatic operation function is referred to as a disabling request, a processor configured to:

determine a presence or absence of the disabling request;

determine whether the vehicle is stopped or not;

determine whether the vehicle is located on a slope; and operate the electric parking brake by the EPB automatic operation function when the vehicle is stopped on the slope while the disabling request is made and continue operation of the parking brake while the vehicle remains stopped on the slope after the disabling request has been made.

6. The vehicle control device according to claim 5, wherein the processor is configured to continue an operating state of the parking brake that was activated when the vehicle is stopped on the slope during the disabling request, while a shift range control device drives a shift actuator to switch the shift range from a drive range to a parking range.

7. The vehicle control device according to claim 6, wherein the processor is configured to release an operating state of the parking brake that was activated when the vehicle is stopped on the slope while the disabling request is made, when the shift range is a travel range and an accelerator is turned on.

* * * * *